United States Patent
Sundman et al.

(10) Patent No.: US 11,218,346 B2
(45) Date of Patent: Jan. 4, 2022

(54) TRANSMITTING AN AMPLITUDE SHIFT KEYING SIGNAL CONCURRENTLY WITH AN OFDM TRANSMISSION

(71) Applicant: Telefonaktiebolaget LM Ericsson (publ), Stockholm (SE)

(72) Inventors: Dennis Sundman, Sollentuna (SE); Miguel Lopez, Solna (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/979,666

(22) PCT Filed: Mar. 13, 2018

(86) PCT No.: PCT/EP2018/056255
§ 371 (c)(1),
(2) Date: Sep. 10, 2020

(87) PCT Pub. No.: WO2019/174718
PCT Pub. Date: Sep. 19, 2019

(65) Prior Publication Data
US 2021/0044465 A1    Feb. 11, 2021

(51) Int. Cl.
*H04L 27/02*   (2006.01)
*H04L 5/00*    (2006.01)
(Continued)

(52) U.S. Cl.
CPC ............ *H04L 27/02* (2013.01); *H04L 5/0044* (2013.01); *H04L 27/2607* (2013.01); *H04L 27/2646* (2013.01); *H04W 52/0229* (2013.01)

(58) Field of Classification Search
None
See application file for complete search history.

(56) References Cited

U.S. PATENT DOCUMENTS

| | | | |
|---|---|---|---|
| 7,769,092 B2 | 8/2010 | Nagasaka | |
| 2017/0280392 A1* | 9/2017 | Segev | H04W 52/0235 |

(Continued)

FOREIGN PATENT DOCUMENTS

WO    2016/153548 A1    9/2016

OTHER PUBLICATIONS

International Search Report and Written Opinion issued in International Application No. PCT/EP2018/056255 dated Dec. 3, 2018 (10 pages).

(Continued)

*Primary Examiner* — Otis L Thompson, Jr.
(74) *Attorney, Agent, or Firm* — Rothwell, Figg, Ernst & Manbeck, P.C.

(57) ABSTRACT

A method of transmitting an amplitude shift keying signal comprises determining timing of an Orthogonal Frequency Division Multiplex, OFDM, transmission of a concurrently operating transmission system, wherein the OFDM transmission applies an extended representation for at least a part of the transmitted OFDM transmission, which extended representation comprises an extended part, representing a data signal to be transmitted by amplitude shift keying, and transmitting the amplitude shift keyed data signal intermittently aligned with the OFDM transmission such that symbols of the amplitude shift keyed data signal occurs only during the extended part of the OFDM transmission. The data signal may represent a wake-up signal arranged to address a wake-up radio. A transmitter, network node and computer program for implementing the method are also disclosed.

16 Claims, 9 Drawing Sheets

(51) Int. Cl.
*H04L 27/26* (2006.01)
*H04W 52/02* (2009.01)

(56) References Cited

U.S. PATENT DOCUMENTS

2019/0288901 A1* 9/2019 Pekoz ............... H04L 27/2605
2019/0387469 A1* 12/2019 Wilhelmsson .... H04W 52/0206
2020/0037251 A1* 1/2020 Du ..................... H04W 28/065

OTHER PUBLICATIONS

Xiaofei Wang, (Interdigital): "On the Coexistence of 802.11ax and 802.11ba Signals", doc.: IEEE Draft, vol. 802.11ba, No. 3, May 2017 (21 pages).
Leif Wilhlemsson et al., "Partial OOK—Generalizing the Blank GI Idea", doc.: IEEE 802.11-17/1673r1, Nov. 2017 (25 pages).
Junghoom Suh et al., "Blank GI for the Waveform Coding" Huawei, doc.: IEEE 802.11-17/0696r0, May 2017 (8 pages).
ETSI EN 300 328, V2.1.1 (Nov. 2016), Wideband transmission systems; Data transmission equipment operting in the 2, 4 GHz ISM band and using wide band modulation techniques; Harmonised Standard covering the essential requirements of article 3.2 of Directive 2014/53/EU, Nov. 2016 (101 pages).
Steve Shellhammer et al., "WUR Data Rates", Qualcomm, doc.: IEEE 802.11-17/0990r2, Jul. 2017 (9 pages).
Minyoung Park et al., "LP-WUR (Low-Power Wake-Up Receiver) Follow-Up", Intel Corporation, doc,: IEEE 802.11-16/0341r0, Mar. 2016 (9 pages).
Eunsung Park et al., "Various Symbol Types for WUR", LG Electronics, doc.: IEEE 802.11-17/0350r0, Mar. 2017 (21 pages).
Yongho Seok et al., "Coexistence Mechanism for Wakeup Radio Signal", NEWRACOM, doc.: IEEE 802.11-16/1114R0, Aug. 2016 (11 pages).

* cited by examiner

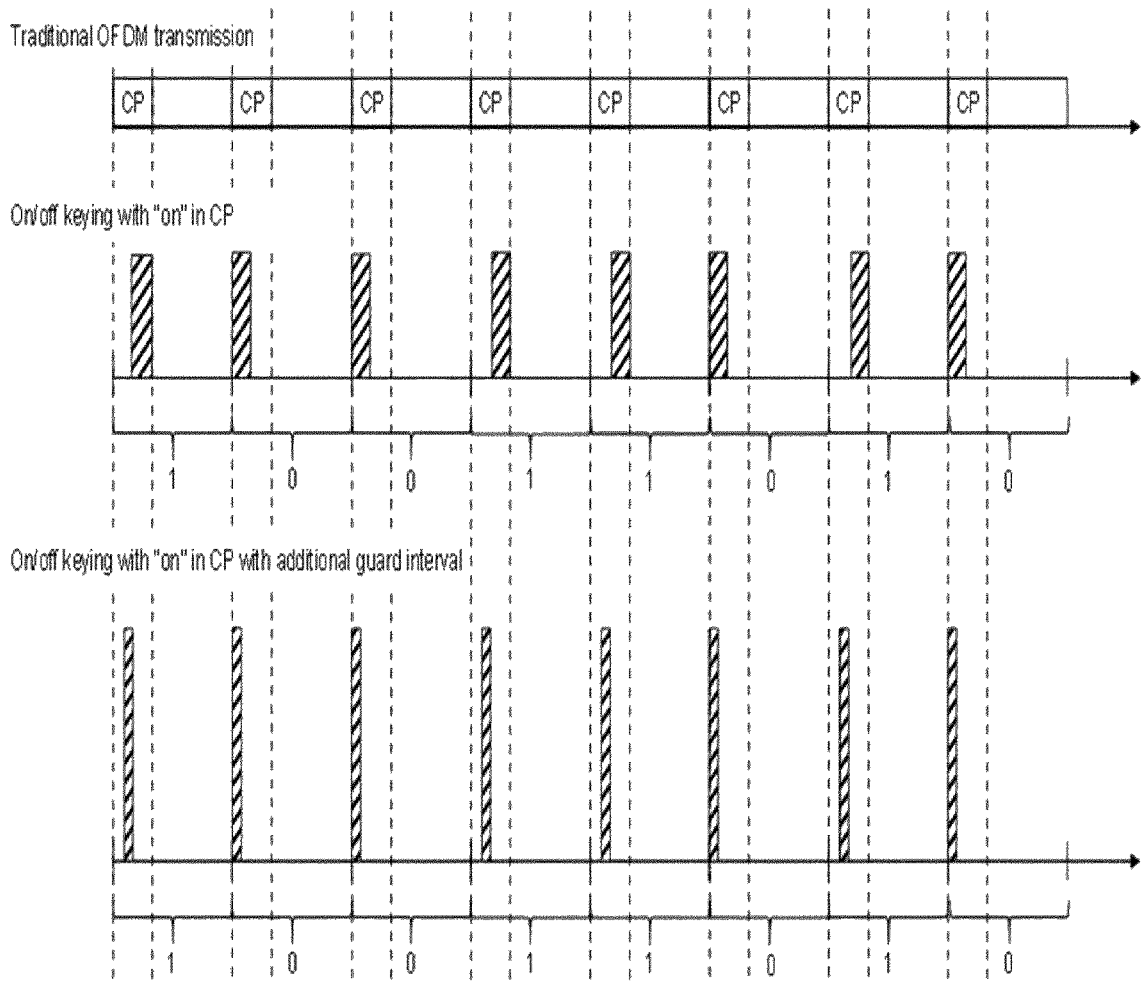
FIG. 15
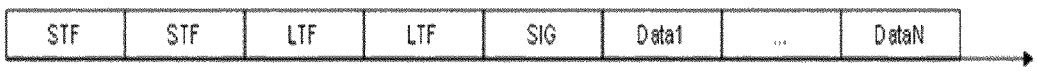
FIG. 16
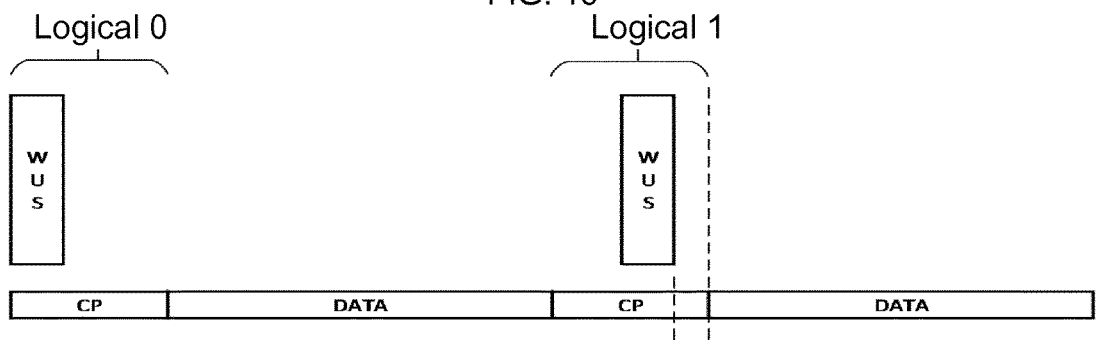
FIG. 17

TRANSMITTING AN AMPLITUDE SHIFT KEYING SIGNAL CONCURRENTLY WITH AN OFDM TRANSMISSION

CROSS REFERENCE TO RELATED APPLICATION(S)

This application is a 35 U.S.C. § 371 National Stage of International Patent Application No. PCT/EP2018/056255, filed Mar. 13, 2018, designating the United States.

TECHNICAL FIELD

The present disclosure generally relates to a transmitter, a network node, methods therefor, and computer programs for implementing the method. In particular, the disclosure relates to transmitting a wireless signal carrying binary information.

BACKGROUND

The telecommunications domain has often so forth been accompanied by a significant increase of electrical energy consumption. Demands on performance, such as spectral efficiency or data rate, have been met at the expense of more energy consumption. Advances in analogue and digital electronics have enabled development of low-cost, low-energy wireless nodes. However, energy consumption remains an issue for some applications. The approach used for idle mode listening, especially when used by devices related to the field commonly referred to as Internet of Things, IoT, in wireless networks impacts the overall energy consumption for the devices. This is particularly noticeable when the data traffic is very sporadic.

Energy reduction may for example be performed by an approach in which it is possible to switch off a radio frequency main interface during inactive periods and to switch it on only if a communication demand occurs. For example, by using a wake-up radio, where a wake-up signal is sent by using a transmitter, received and decoded at the device, wherein the main radio is activated, significant energy consumption reduction may be achieved for many applications.

Furthermore, efforts to reduce energy consumption may be made at different levels of the communication stack, such as the medium access control (MAC) protocol, by dynamically adapting the sleep and wake times of main radio protocols. Limited complexity signals and thus limited complexity decoders for the intermittently presented control signals may improve energy efficiency.

Wake-up radio is a technology being discussed for achieving such reduction in energy consumption, and is for example a topic in the 802.11 Task Group 802.11ba where it is decided to use an on/off keying (OOK) modulation scheme together with Manchester coding. There will at least be two rates: 62.5 kbps and 250 kbps. The reason for using OOK is that it may be demodulated using an envelope detector, which can be implemented at very low complexity. Furthermore, an approach, including wake-up receiver and time division duplex (TDD) support for narrow-band Internet of Things (NB-IoT), is under discussion under $3^{rd}$ Generation Partnership Project (3GPP) to further enhance machine-type communication (MTC) and NB-IoT.

These efforts affect the physical layer (PHY), where control mechanisms for activation or deactivation of more energy consuming operations reside, which put demands on lean control signalling.

An example in the PHY is application of an On-Off Keying, OOK, signal as illustrated in FIG. 1, which is a modulation scheme where the presence of a signal represents the ON part or state and the absence of the signal represents the OFF part or state. For example, the ON and OFF parts could represent binary digits, or the transition between ON to OFF state and OFF to ON state could represent binary digits. OOK is considered the simplest form of amplitude-shift keying, ASK, that represents digital data at the presence or absence of a signal. In its simplest form, the presence of a carrier for a specific duration represents a binary one, while its absence for the same duration represents a binary zero. Some more sophisticated schemes vary these durations to convey additional information. OOK is analogous to unipolar encoding, which is a special case of a line code. OOK is a suitable modulation to use whenever the power consumption of the receiver is a major concern, as the demodulation can be done non-coherently, with very relaxed requirements on gain control and resolution in the receiver.

In order to decode OOK, the receiver has to estimate which signal level corresponds to the presence of a signal and which signal level corresponds to the absence of a signal. Manchester Coding is a modulation means used to simplify clock recovery and to simplify demodulation by ensuring that the average signal level of the signal carries no information. FIG. 2 illustrates a data bit with value one is represented by, i.e. encoded to, a logical one followed by a logical zero, whereas a data bit with value zero is represented by a logical zero followed by a logical one. Alternatively, the encoding can be swapped so that a data bit with value one is represented by a logical zero followed by a logical one, etc.

Clock recovery is simplified because there will always be a transition from zero to one or vice versa in the middle of each symbol irrespectively of what the data is.

The decoding of the Manchester coded symbol is essentially done by comparing the first and the second half of the symbols and deciding in favour of a logical one if the first half of the symbol has larger energy than the second half of the same symbol, or vice versa. Instead of energy, one can also use other means of measuring the signal level, for example absolute signal-envelope averaged over the symbol duration.

For example, Manchester coded OOK is being standardized within the IEEE 802.11ba task group (TG). TG 802.11ba develops a standard for wake-up radios (WUR), targeting to significantly reduce the power consumption in devices based on the IEEE 802.11 standard. It is proposed to generate the wake-up signal (WUS) by using an inverse fast Fourier transform (IFFT), as this block is already available in Wi-Fi transmitters supporting e.g. IEEE 802.11a/g/n/ac. Specifically, an approach discussed for generating the OOK is to use the 13 sub-carriers in the centre, possibly excluding the DC carrier, and then populating these with some signal to represent ON and to not transmit anything at all to represent OFF.

As an alternative to OOK and textbook Manchester coded OOK, as shown in FIGS. 1 and 2, it is feasible to zero-pad a portion of the ON part of the signal to further improve the performance. FIGS. 3 to 5 illustrate such approaches, where $T_Z$ and $T_{NZ}$ denote the time when the ON signal, i.e. where the signal is ON in the examples given in FIGS. 1 and 2, is zero and non-zero, respectively. FIG. 3 illustrates to the left a traditional Manchester OOK and to the right an adapted keying with zero-padded parts $T_Z$. The potential improvement comes from that the same energy is received during a shorter time $T_{NZ}$. Since the noise energy is proportional to that time, the signal-to-noise ratio, SNR, may be increased correspondingly upon properly arranged reception of the signal. Thus, FIG. 4 illustrates a signal with modified OOK by zero-padding of a portion $T_Z$ of the symbol time $T_b$, and FIG. 5 illustrates a signal with modified Manchester OOK by zero-padding a portion $T_Z$ of the signal part that traditionally would have been ON. FIGS. 6 to 9 illustrate variants thereof where representation and placement of zero-padding portion are varied. The zero-padding portion may for example be used as guard intervals for limiting inter-symbol interference with adjacent symbols. For example, it has been proposed in 802.11ba that the signal should have a guard interval (GI) before an "on" period when using on/off keying, as for example shown in submission IEEE 802.11-17/0696r0 with title "Blank GI for the Waveform Coding" by J. Suh et al, May 2017. The benefit with this is that the power of the "on" period can be boosted since the allowed power is calculated over a certain time. Put shortly, if the same energy of the signal can be sent in shorter time, and thereby also received in shorter time, the received signal used for demodulation will contain less noise energy and consequently the signal-to-noise-ratio of the signal will be improved. FIGS. 10 and 11 illustrates application of guard intervals, GI, when applying Manchester coded OOK, and illustrate comparisons with traditional Manchester coded OOK and with traditional OFDM transmissions. FIG. 10 illustrates providing one Manchester coded OOK symbol, i.e. representing a bit, per time of two OFDM symbols of the considered OFDM transmission, while FIG. 11 illustrates a one-to-one relationship between the OFDM symbol time and the time for each Manchester coded OOK.

FIG. 12 illustrates a traditional packet format used for example in IEEE 802.11a. A preamble is provided comprising training fields, short training field (STF) providing initial timing synchronisation and frequency estimate and long training field (LTF), two symbols each, providing fine timing and frequency synchronisation and channel response estimation, and a signal field (SIG), one symbol, comprising control information. The preamble is followed by data symbols (Data1-DataN). The training fields are direct sequence spread spectrum modulated while the signal field and data fields are OFDM transmissions. Here, it can be noted that the preamble format demonstrated here is often referred to as "legacy preamble" and is commonly reused as part of preamble in other flavours of IEEE 802.11.

OOK transmissions are in nature best suited for low-rate transmissions, and are furthermore often used in applications where link budget is demanding. Coexistence with more complex transmissions, such as the above demonstrated OFDM transmissions may become an issue when OOK transmissions occupy a common spectrum. It is therefore a desire to provide an approach for efficient coexistence.

The above information disclosed in this Background section is only for enhancement of understanding of the invention demonstrated below and therefore it may contain information that does not form the prior art that is already known to a person of ordinary skill in the art, and in particular not in the compilation presented above.

SUMMARY

The disclosure is based on the inventors' understanding that aligning of concurrently operating systems will make operation more efficient. The inventors have further realised that by aligning one of the systems to an extended part of the other system, where the extended part comprises redundant or no information, effects of interference on the other system may be limited.

According to a first aspect, there is provided a method of transmitting an amplitude shift keying signal. The method comprises determining timing of an Orthogonal Frequency Division Multiplex, OFDM, transmission of a concurrently operating transmission system. The OFDM transmission applies an extended representation for at least a part of the transmitted OFDM transmission. The extended representation comprises an extended part. The method further comprises representing a data signal to be transmitted by amplitude shift keying. The method also comprises transmitting the amplitude shift keyed data signal intermittently aligned with the OFDM transmission such that symbols of the amplitude shift keyed data signal occurs only during the extended part of the OFDM transmission.

The extended part may comprise any of a cyclic prefix and a zero-padding.

Symbols of the amplitude shift keyed data signal may be transmitted only during payload symbols of the OFDM transmission.

One amplitude shift keyed data signal symbol per extended representation may be used for the symbols where the amplitude shift keyed data signal occurs. Alternatively, one amplitude shift keyed data signal symbol per a plurality of extended representations may be used for the symbols where the amplitude shift keyed data signal occurs.

The alignment with the OFDM transmission may be such that symbols of the amplitude shift keyed data signal are provided with a guard interval to the beginning or end of the extended representation of the OFDM transmission, wherein no amplitude shift keyed data signal transmission is performed during the guard interval.

The representing of the data signal to be transmitted by amplitude shift keying may be performed by on-off keying. Alternatively, the representing of the data signal to be transmitted by amplitude shift keying may be performed by applying a Manchester code.

The data signal may be representing a wake-up signal arranged to address a wake-up radio.

According to a second aspect, there is provided a computer program comprising instructions which, when executed on a processor of a network node, causes the network node to perform the method according to the first aspect.

According to a third aspect, there is provided a transmitter arranged to provide a signal by performing the method according to the first aspect.

The signal may be a wake-up signal arranged to address a wake-up radio.

According to a fourth aspect, there is provided a network node comprising the transmitter according to the third aspect.

The network node may be arranged to operate as a combined access point for both the OFDM transmissions and the amplitude shift keying data signal transmissions, wherein the determining of timing of the OFDM transmission of the concurrently operating transmission system is provided within the network node. Alternatively, the network node may be arranged to operate as an access point for the amplitude shift keying data signal transmissions, wherein the network node comprises an interface for the determining of timing of the OFDM transmission of the concurrently operating transmission system. The interface may be arranged to receive transmissions comprising training fields transmitted by the concurrently operating transmission system for the determining of the timing of the OFDM transmission of the concurrently operating transmission system based on the received training fields.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

FIG. 5 illustrates a signal with modified Manchester OOK by zero-padding a portion $T_Z$ of the signal part that traditionally would have been ON.

FIG. 12 illustrates a traditional packet format used for example in IEEE 802.11a.

FIG. 15 illustrates examples according to an embodiment where Manchester coding (or similar) is used within a single extended part.

FIG. 16 is a rough signal diagram illustrating timing of OFDM transmissions by a concurrently operating transmission system, similar as the one demonstrated above with reference to FIG. 12, and the corresponding suitable timings of a wake-up signal, WUS.

FIG. 17 is a signal diagram which illustrates an example of alignment between OFDM signal and WUS.

DETAILED DESCRIPTION

Figure 1:
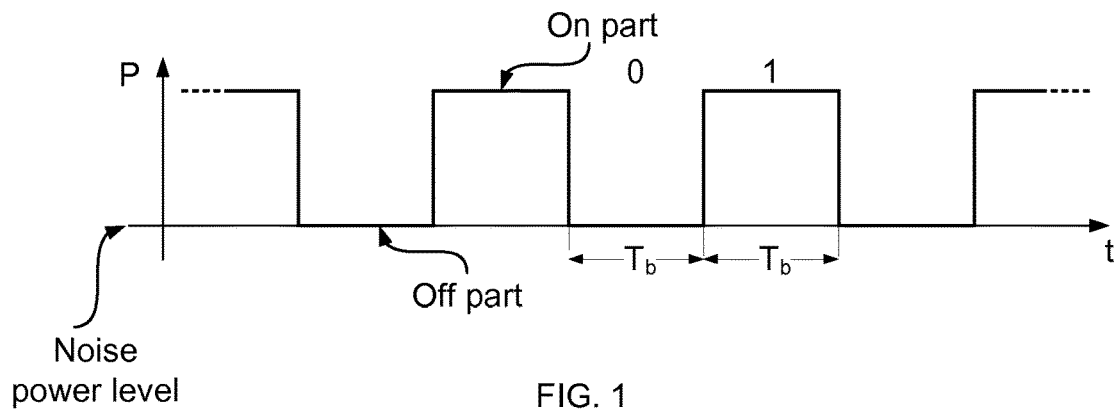
FIG. 1 schematically illustrates an on-off keying signal.
Figure 2:
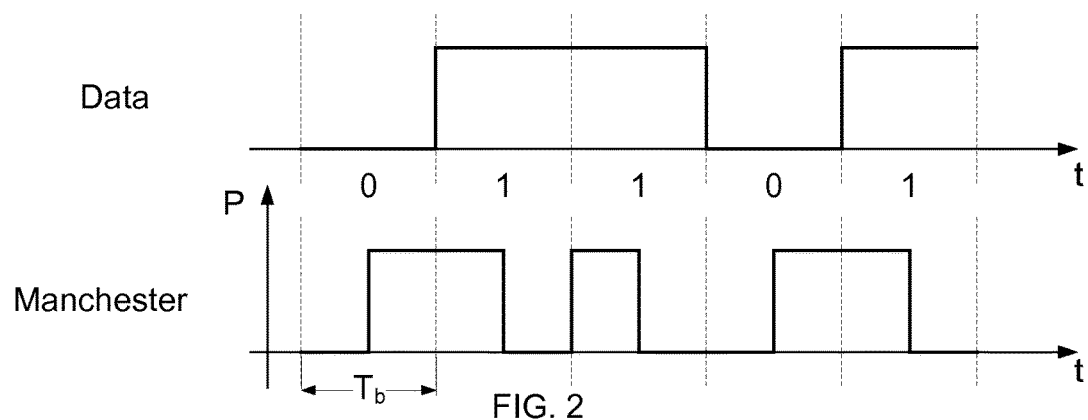
FIG. 2 illustrates a data bit with value representation.
Figure 3:
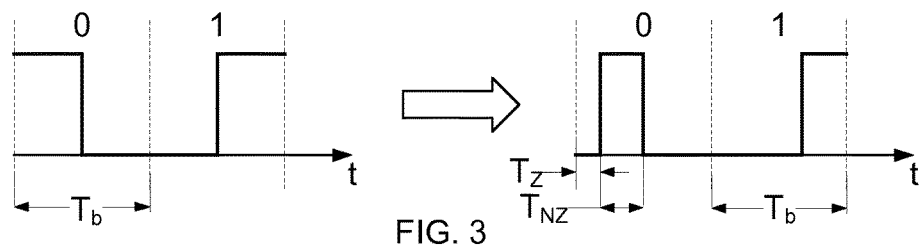
FIG. 3 schematically illustrates a modified value representation.
Figure 4:
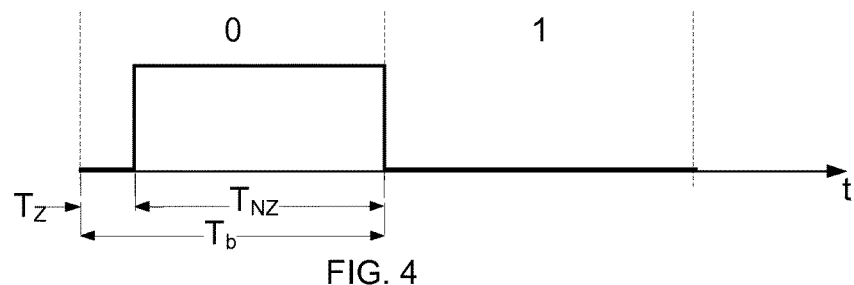
FIG. 4 illustrates a signal with modified OOK by zero-padding of a portion $T_Z$ of the symbol time $T_b$.
Figure 5:
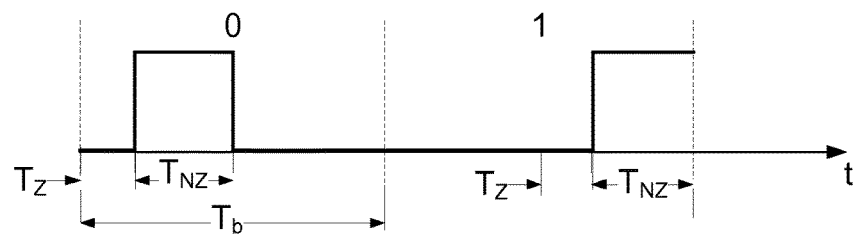
Figure 6:
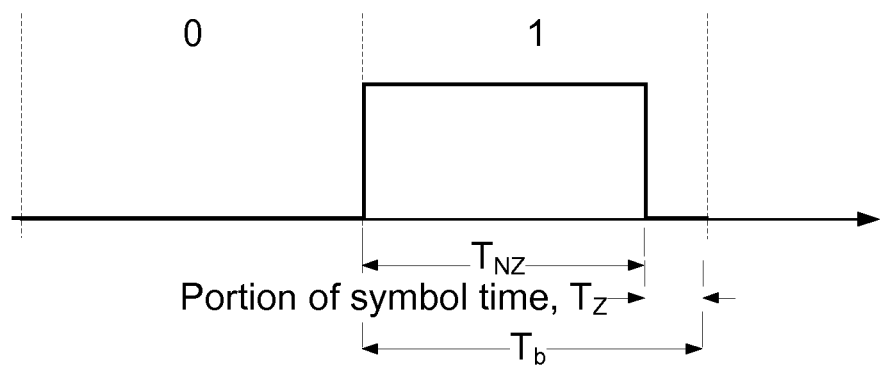
FIGS. 6 to 9 illustrate variants of amplitude shift keying signals where representation and placement of zero-padding portion are varied.
Figure 7:
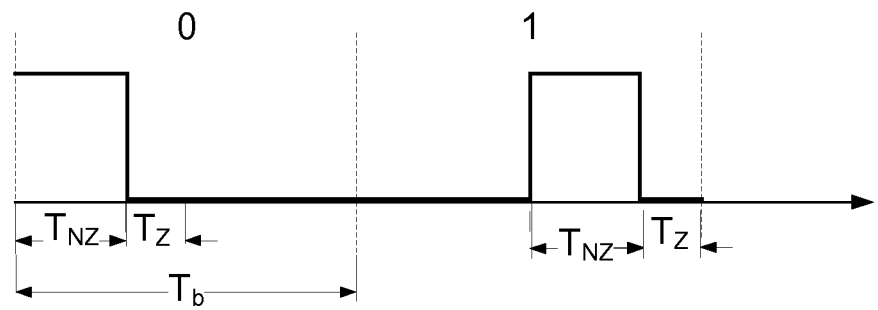
Figure 8:
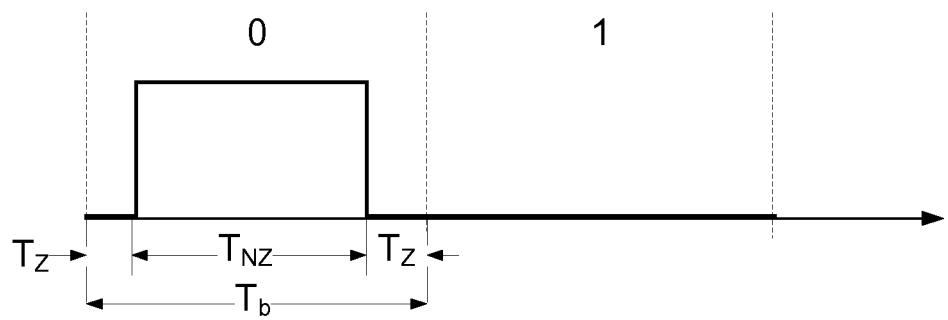
Figure 9:
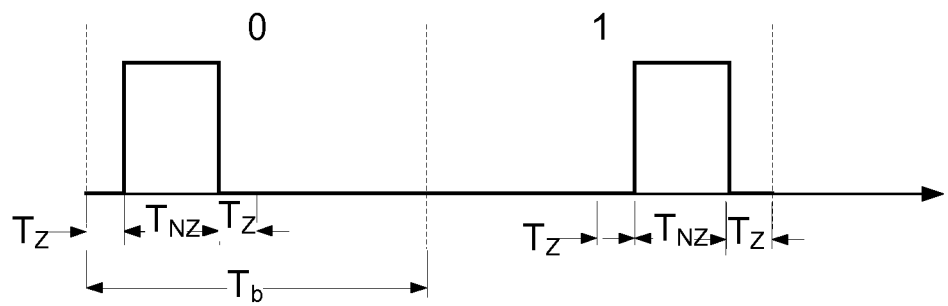
Figure 10:
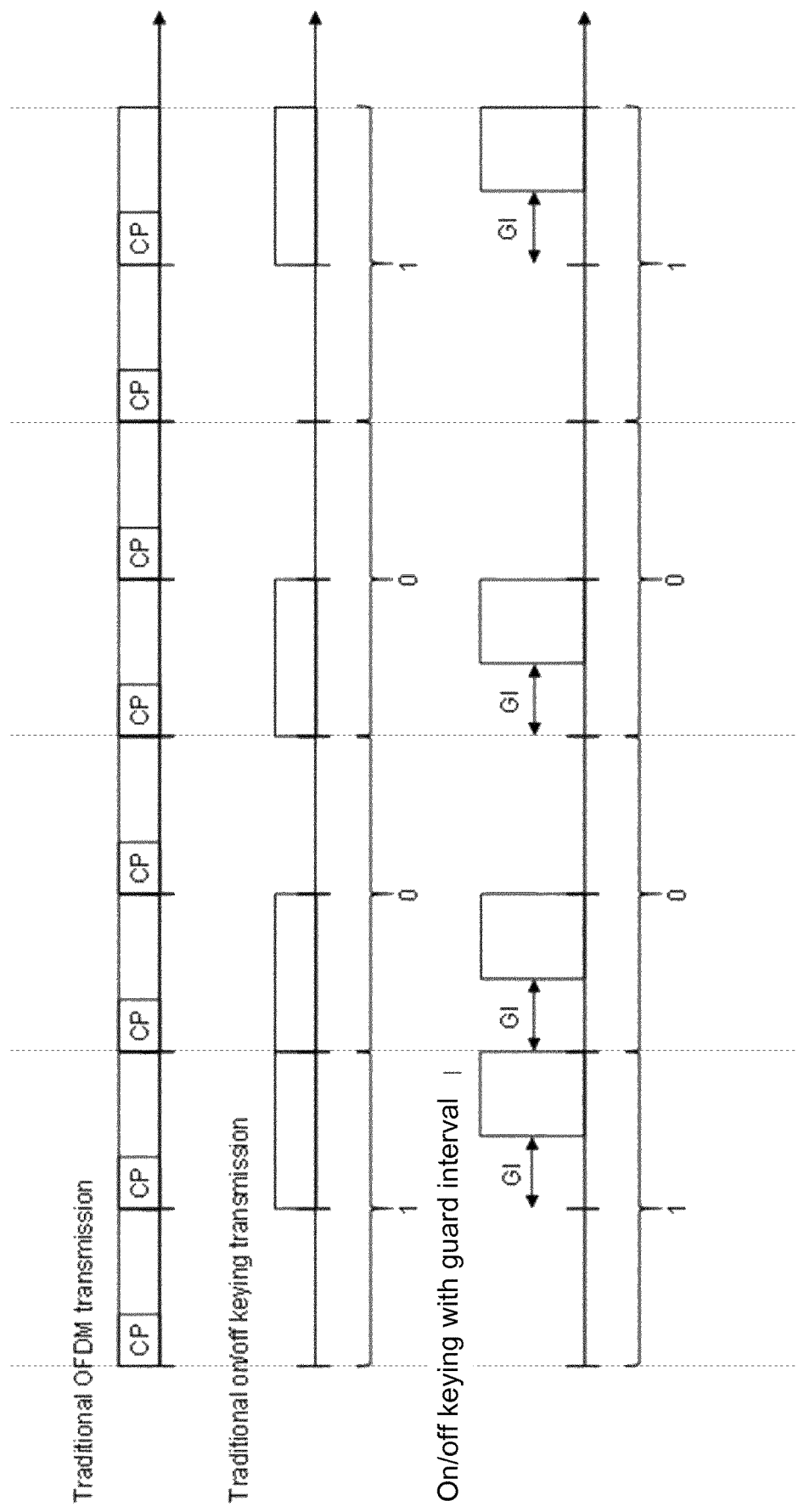
FIGS. 10 and 11 illustrates application of guard intervals in traditional alignments of amplitude shift keying signals with OFDM transmissions of a concurrently operating transmission system.
Figure 11:
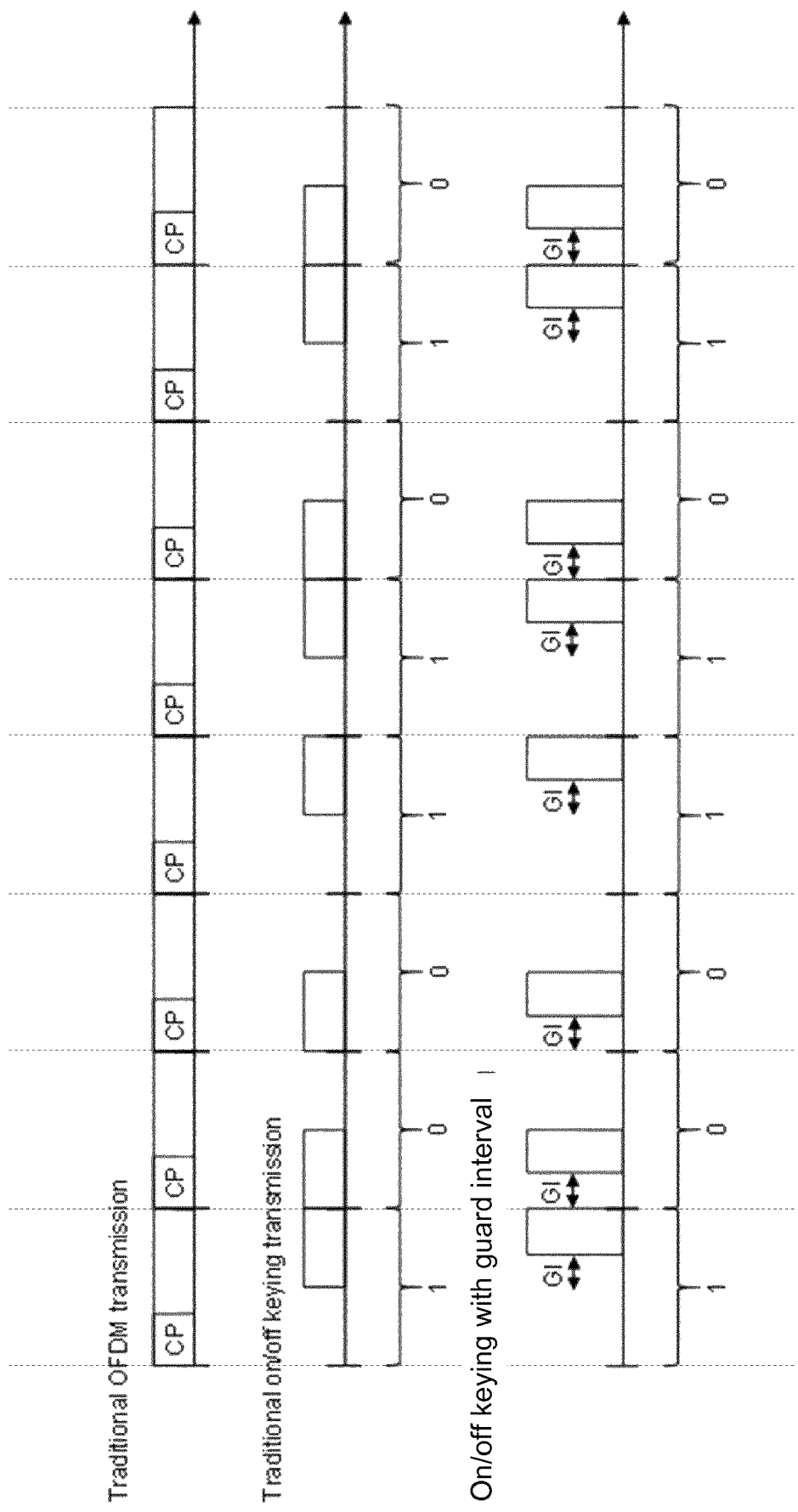
Figure 13:
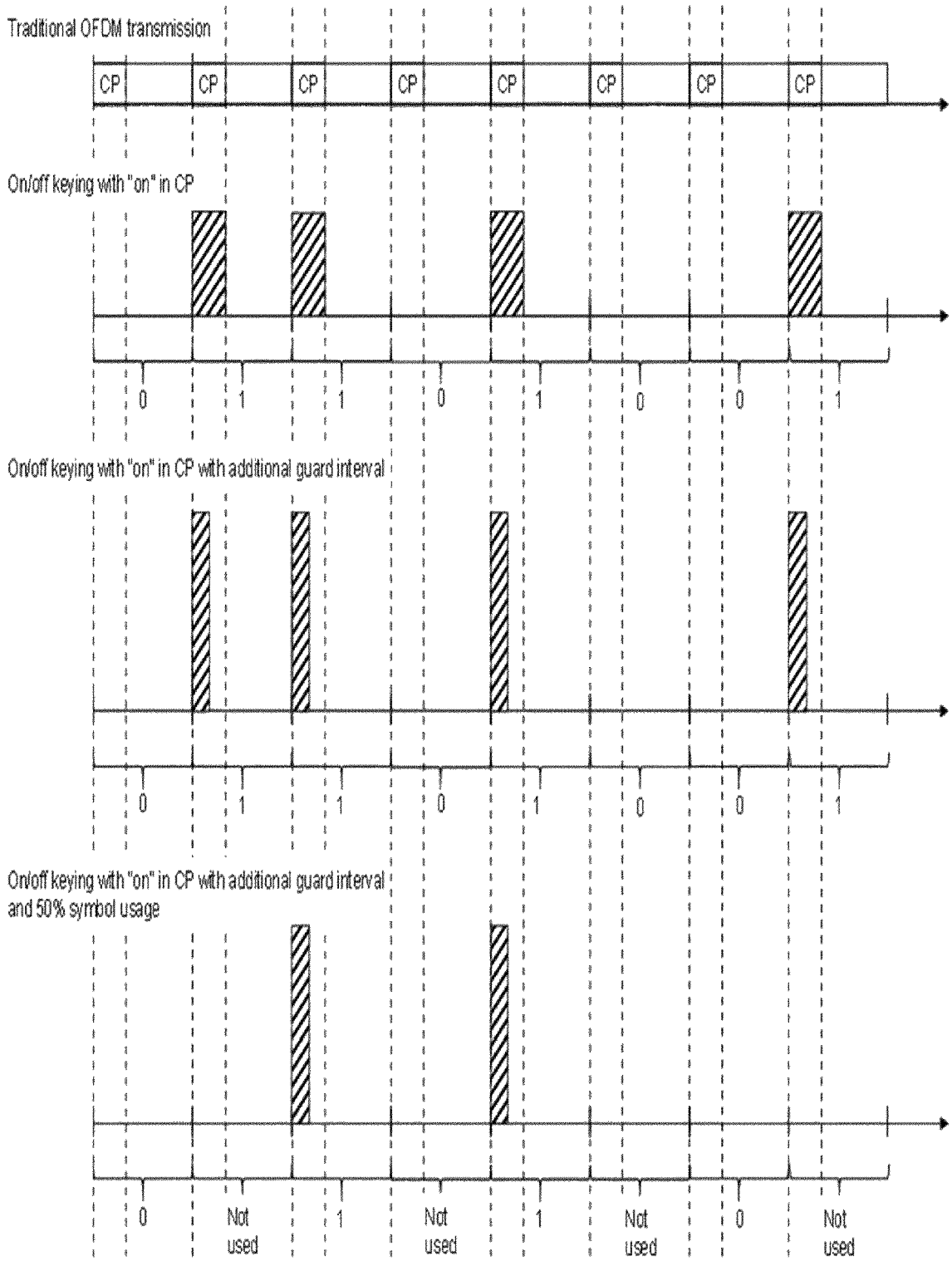
FIG. 13 is a signal diagram illustrating some examples of transmitting an amplitude shift keyed data signal intermittently aligned with an OFDM transmission such that symbols of the amplitude shift keyed data signal occurs only during an extended part of the OFDM transmission.

FIG. 13 is a signal diagram illustrating some examples of transmitting an amplitude shift keyed data signal intermittently aligned with an OFDM transmission, illustrated at top, such that symbols of the amplitude shift keyed data signal occurs only during the extended part, here cyclic prefix illustrated, of the OFDM transmission. Among the examples, beginning from top of FIG. 13 below the illustration of timing of the traditional OFDM transmission by a concurrently operating transmission system, first a pure OOK transmission occupying an essential part of the extended part with one OOK symbol per extended part, i.e. per OFDM symbol, is illustrated.

Second, a similar approach as the first example is illustrated, but with the addition that a guard interval is applied to limit signal leakage of the OOK signal outside the time slot of the extended part.

Third, an example is shown where not all extended parts of the OFDM signal are used, in this example every other is used. In the third example, a guard interval is illustrated to be applied, but the approach may be applied without guard interval as well. Still further, other relations than every other extended part may be applied, e.g. every third, every fourth, etc., or any other pattern of usage.

An advantage of applying the approach of omitting usage of symbol space at some time instants, which may be referred to as puncturing, may be that average power level for the amplitude shift keying signal can be kept within bounds while the signal energy for respective amplitude shift keying symbol can be kept fairly high.

It is to be noted that there will be interference between the OFDM transmission and the amplitude shift keyed data signal transmission. However, the impact on the OFDM transmission is limited since there is inherent redundant signal for the OFDM symbol since the amplitude shift keyed data signal is within the bounds of the extended part. The impact on the amplitude shift keyed data signal is in practical cases manageable due to the inherent robustness of the amplitude shift keyed data signal.

While the examples of FIG. 13 use a per extended part as symbol as a timing unit, optionally with puncturing as given by the third example of FIG. 13, and pure OOK, other approaches are feasible.

Figure 14:
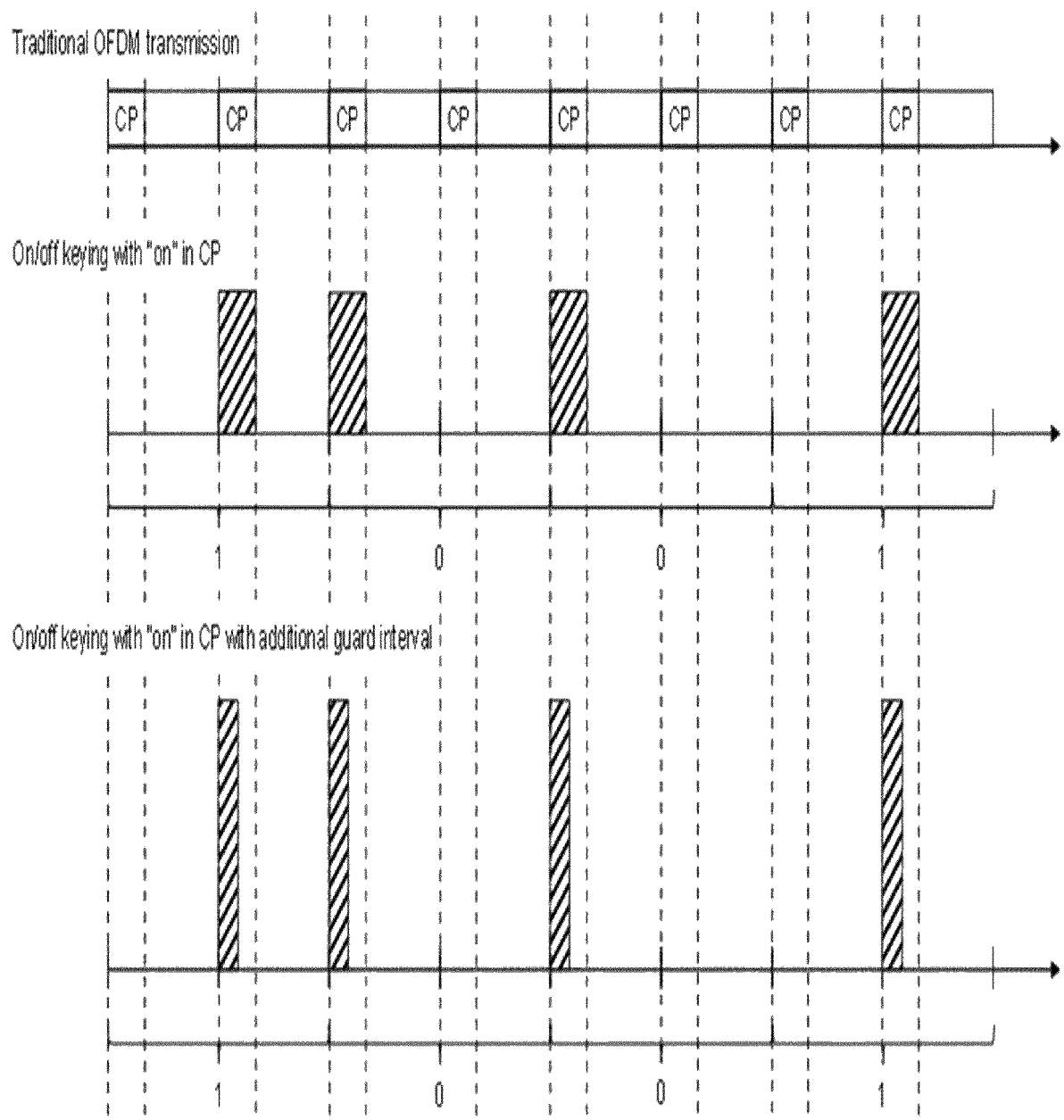
FIG. 14 illustrates examples according to an embodiment where Manchester coding (or similar) is used and taking two OFDM symbol times for putting in the two parts of the Manchester coding in respective extended part of the OFDM transmission.

FIG. 14 illustrates examples according to an embodiment where Manchester coding (or similar) is used and taking two OFDM symbol times for putting in the two parts of the Manchester coding in alignment with respective extended part of the OFDM transmission. The symbol rate of the amplitude shift keyed data signal will thus be half of that illustrated in FIG. 13, or less since the puncturing approach as illustrated in FIG. 13 may be applied here as well although not illustrated, i.e. leaving some extended parts of the OFDM signal unused. Among the examples, beginning from top of FIG. 14 below the illustration of timing of the traditional OFDM transmission by a concurrently operating transmission system, first a Manchester coded transmission occupying an essential part of the extended parts with one amplitude shift keyed symbol per two extended parts, i.e. per two OFDM symbols, is illustrated. Second, a similar approach as the first example is illustrated, but with the addition that a guard interval is applied to limit signal leakage of the amplitude shift keyed signal outside the time slot of the extended part.

FIG. 15 illustrates examples according to an embodiment where Manchester coding (or similar) is used within a single extended part. Among the examples, beginning from top of FIG. 15 below the illustration of timing of the traditional OFDM transmission by a concurrently operating transmission system, first a Manchester coded transmission occupying an essential part of the extended part with one amplitude shift keyed symbol per extended part, i.e. one per OFDM symbol, is illustrated. Second, a similar approach as the first example is illustrated, but with the addition that a guard interval is applied to limit signal leakage of the amplitude shift keyed signal outside the time slot of the extended part. The symbol rate of the amplitude shift keyed data signal will thus be the same of that illustrated in FIG. 13, or less since the puncturing approach as illustrated in FIG. 13 may be applied here as well although not illustrated, i.e. leaving some extended parts of the OFDM signal unused.

The amplitude shift keyed data signal may be used for a wake-up signal, WUS, intended to provide a control signal for a wake-up receiver arranged to control on and off states of a main transceiver of the communication apparatus based on the signal received by the receiver. The approach with WUS and wake-up receivers may be used for lean or extremely lean transmissions, where the wake-up receiver has the purpose of receiving the wake-up signal and upon proper decoding thereof initiate operation of a main transceiver of the receiving entity, wherein the main transceiver commences traffic exchange with e.g. a network node. Features of receivers of such lean or extremely lean transmissions are often that they are low complexity and low power consuming. This normally leads to that they are specified for low bitrate communication, which makes the amplitude shift keying signal suitable.

FIG. 16 is a rough signal diagram illustrating timing of OFDM transmissions by a concurrently operating transmission system, similar as the one demonstrated above with reference to FIG. 12, and the corresponding suitable timings of a WUS, taking into account the more detailed timing demonstrated in any one of FIGS. 13 to 15, since SIG and Data symbols of the OFDM transmission normally apply an extended part, e.g. cyclic prefix.

Here, the WUS transmitter may receive the training symbols STF, LTF of the concurrently operating transmission system and thereby acquire synchronisation to be enabled to align the WUS to the extended parts, e.g. cyclic prefix, of the OFDM symbols transmitted by the concurrently operating transmission system when the concurrently operating transmission system transmits the SIG and Data symbols.

FIG. 17 is a signal diagram which illustrates an example of alignment between OFDM signal and WUS. A guard interval is provided to limit the risk of WUS interfering the non-extended part of the OFDM symbol, e.g. due to dispersion of signal over the channel and/or propagation time between entities. The size of the guard interval may be selected on one hand to provide sufficient limitation of the risk of the WUS to interfere the non-extended part of the OFDM symbol, and on the other hand to provide sufficient time for the amplitude shift keyed symbol within the time of the extended part of the OFDM symbol.

In case the length of the extended part can be configured, e.g. in the case of IEEE 802.11ax where length of cyclic prefix can be selected, it can for example be beneficial to choose a long cyclic prefix length, e.g. 3.2 µs. In this way there is more freedom to place the amplitude shift keyed symbol, and thus to provide a sufficient guard interval. For example, the amplitude shift keyed symbol could have a duration of 2.4 µs, i.e. with an on-part of 1.2 µs and an off-part of 1.2 µs, leaving a 0.8 µs=(3.2−1.2−1.2 µs) guard interval, thus reducing, and in some cases even avoiding, interference from the WUS to affect the non-extended part of the OFDM symbol.

For information, 0.8 µs is the cyclic prefix length used in IEEE 802.11a/g and most often in IEEE 802.11n/ac, so a guard interval of 0.8 µs as demonstrated above should be sufficient for almost any case. On the other hand, the case where the cyclic prefix is only 0.8 µs, the assignment of symbol time for the amplitude shift keyed symbol and guard interval has a stricter time budget.

Returning to the example where the extended part is selectable to be fairly long, the generous time budget may be used to spread the amplitude shift keyed symbol in time to provide a sufficient symbol energy with limited maximum power, possibly at expense of the length of the guard interval.

The synchronisation to the OFDM transmission to enable the alignment of the amplitude shift keyed symbol may be provided in different ways. The systems may for example be co-located, wherein common control may provide for the synchronisation. Another example is that the WUS transmitter receives training symbols of the concurrently operating transmission system and thus is enabled to synchronise. The WUS transmission may in such cases be like demonstrated with reference to FIG. 16. For the case where the extended part of the OFDM symbols are selectable, the configuration may be provided by the concurrently operating transmission system in the SIG symbol, wherein the commencement of WUS transmission reasonably is after the SIG symbol, and the WUS transmitter configures the symbol time and guard interval based on control information provided in the SIG symbol.

Figure 18:
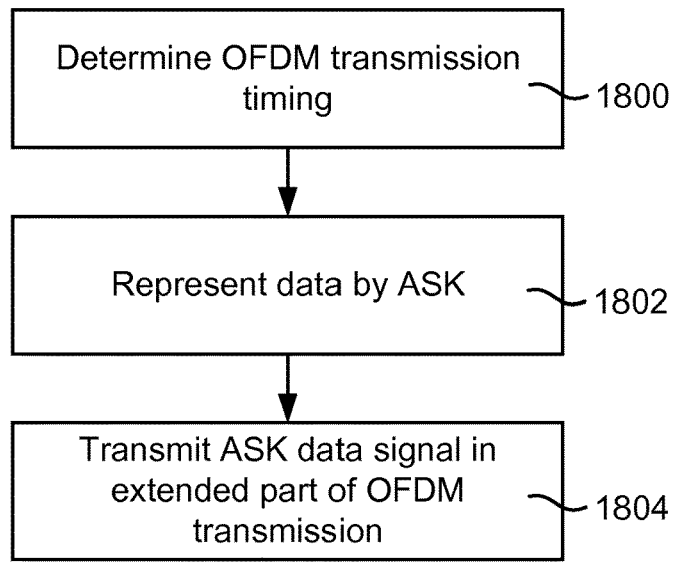
FIG. 18 is a flow chart schematically illustrating a method according to embodiments.

FIG. 18 is a flow chart schematically illustrating a method of transmitting an amplitude shift keying signal according to embodiments. For alignment of the transmission to reduce interference as demonstrated above, the transmitting entity of the amplitude shift keying signal determines 1800 timing of an Orthogonal Frequency Division Multiplex, OFDM, transmission of a concurrently operating transmission system. As discussed above the OFDM transmission is expected to apply an extended representation for at least a part of the transmitted OFDM transmission. The extended representation comprises an extended part, e.g. a cyclic prefix or a zero-padded part. As discussed above, the extended part may be selectable, wherein the determination 1800 also may comprise determining duration of the extended part.

The transmitting entity of the amplitude shift keying signal represents 1802 a data signal to be transmitted by amplitude shift keying. For example, OOK or Manchester coded OOK, with or without a guard interval, as demonstrated above. The transmitting entity then transmits 1804 the amplitude shift keyed data signal intermittently aligned with the OFDM transmission such that symbols of the amplitude shift keyed data signal occurs only during the extended part of the OFDM transmission. As discussed above, the transmission by the concurrently operating transmission system may only apply OFDM symbols with extended part for some parts of the transmission, e.g. for payload symbols. In such cases, symbols of the amplitude shift keyed data signal are transmitted only during payload symbols of the OFDM transmission.

The various alternatives and features demonstrated above may be applied by the method. The transmitted amplitude shift keying signal may be used as a wake-up signal in a wake-up radio employment where a low-complexity wake-up receiver can receive the signal and activate a more complex transceiver arrangement on demand, and thereby save energy compared with keeping the complex transceiver active all the time.

Figure 19:
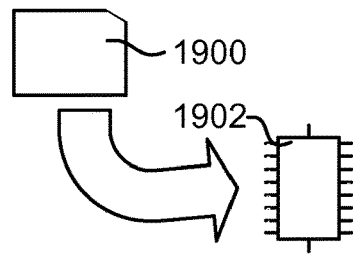
FIG. 19 schematically illustrates a computer-readable medium and a processing device.

The methods according to the present disclosure are suitable for implementation with aid of processing means, such as computers and/or processors, especially for the case where e.g. a processing element 2208 demonstrated below comprises a processor handling the alignment between the amplitude shift keying signal and the OFDM signal as demonstrated above. Therefore, there is provided computer programs, comprising instructions arranged to cause the processing means, processor, or computer to perform the steps of any of the methods according to any of the embodiments described with reference to FIGS. 13 to 18. The computer programs preferably comprise program code which is stored on a computer readable medium 1900, as illustrated in FIG. 19, which can be loaded and executed by a processing means, processor, or computer 1902 to cause it to perform the methods, respectively, according to embodiments of the present disclosure, preferably as any of the embodiments described with reference to FIGS. 13 to 18. The computer 1902 and computer program product 1900 can be arranged to execute the program code sequentially where actions of the any of the methods are performed stepwise, or be made to perform the actions on a real-time basis. The processing means, processor, or computer 1902 is preferably what normally is referred to as an embedded system. Thus, the depicted computer readable medium 1900 and computer 1902 in FIG. 19 should be construed to be for illustrative purposes only to provide understanding of the principle, and not to be construed as any direct illustration of the elements.

Figure 20:
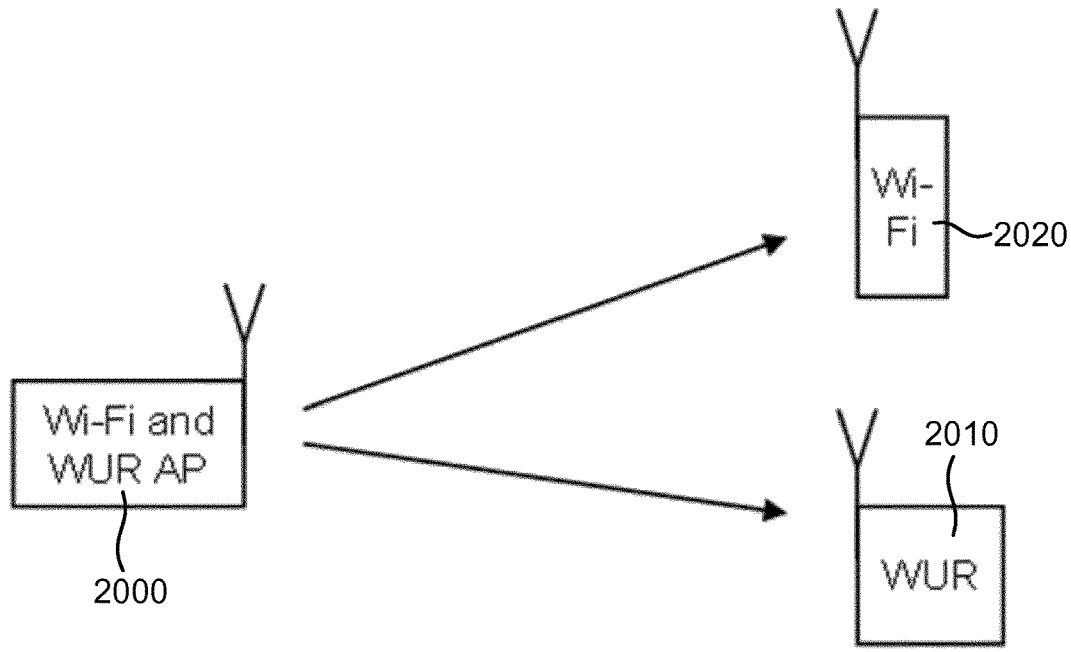
FIG. 20 is a block diagram schematically illustrating a system comprising an integrated network node comprising an access point for the OFDM transmissions and an access point for providing the WUS, a station arranged for transmission and/or reception of OFDM signals, and a wake-up receiver.

FIG. 20 is a block diagram schematically illustrating a system comprising an integrated network node 2000 comprising an access point for the OFDM transmissions and an access point for providing the WUS, a station 2020 arranged for transmission and/or reception of OFDM signals, and a wake-up receiver 2010. Thus, here the transmitting entity of the amplitude shift keying signal is the network node 2000 since it comprises the access point for providing the WUS. An advantage of the integrated network node 2000 is that the network node inherently provides the possibility to align the transmissions of the WUS with the OFDM transmissions as discussed above. The setup may be that a WiFi access point 2000 may have the WUS transmitter as an addon.

Figure 21:
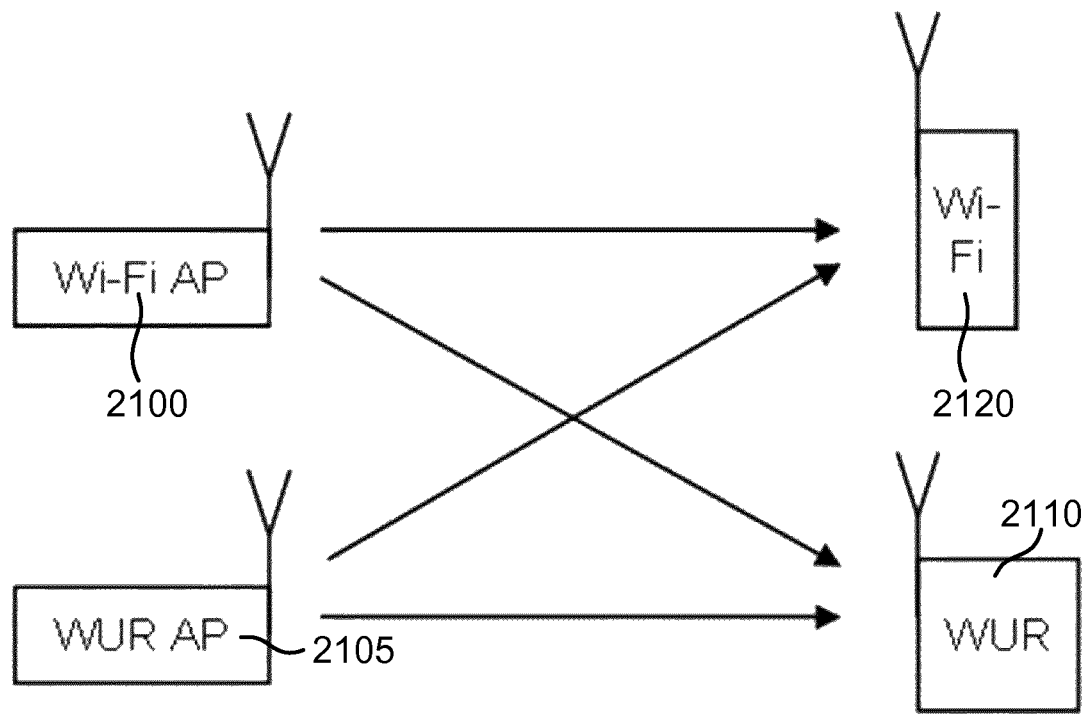
FIG. 21 is a block diagram schematically illustrating a system comprising separate network nodes for an access point for the OFDM transmissions and an access point for providing the WUS, and a station arranged for transmission and/or reception of OFDM signals, and a wake-up receiver.

FIG. 21 is a block diagram schematically illustrating a system comprising separate network nodes for an access point 2100 for the OFDM transmissions and an access point 2105 for providing the WUS, and a station 2120 arranged for transmission and/or reception of OFDM signals, and a wake-up receiver 2110. Thus, here the transmitting entity of the amplitude shift keying signal is the access point 2105 for providing the WUS. The access point 2105 for providing the WUS is arranged to operate as an access point for the amplitude shift keying data signal transmissions. The access point 2105 for providing the WUS comprises an interface for the determining of timing of the OFDM transmission of the concurrently operating transmission system.

The interface may according to one embodiment be arranged to exchange a control signal between the access point for the OFDM transmissions and the access point for providing the WUS from which the timing can be determined. The exchange of the control signal may be wired or wireless.

According to one embodiment, the interface is arranged to receive transmissions comprising training fields, e.g. Short Training Field (STF) and Long Training Field (LTF) as illustrated in FIG. 16, transmitted by the concurrently operating transmission system. From the received transmission the access point for providing the WUS is able to determine the timing of the OFDM transmission of the concurrently operating transmission system based on the received training fields. The access point for providing the WUS is then able to align transmissions of the WUS to extended parts, e.g. signalling (SIG) and data symbols provided by the concurrently operating transmission system following the training fields transmissions, as illustrated in FIG. 16. An advantage of the latter embodiment is that establishment of a dedicated control signal between the access points can be omitted. As discussed above, the commencement of the WUS transmission may depend on when the access node 2105 for providing the WUS has gained enough information to align the transmissions of the WUS with the OFDM transmissions. For example, control information in the SIG symbol, see e.g. FIGS. 12 and 16, may be required before commencing transmission.

In practical implementations of the separate nodes for the access point for the OFDM transmissions and the access point for providing the WUS, the propagation times for transmissions to reach the station arranged for transmission and/or reception of OFDM signals and the wake-up receiver, respectively, do not differ to such an extent that it will jeopardize the alignment. This is particularly the case where guard intervals are applied. However, if applied in particular implementations where propagation times are expected to differ significantly, actions may be taken by for example applying timing advance to maintain alignment, or by increasing guard intervals. Increasing guard intervals may for example be made at expense of transmission rate, e.g. by applying the second example demonstrated with reference to FIG. 14 together with a large ratio between pulse width and the width of the extended part, e.g. short pulse and/or long cyclic prefix. Here, as short pulse with sufficient signal energy, and still keeping average signal power within bounds may call for using puncturing as demonstrated with the last example of FIG. 13, i.e. not using all extended parts. Selecting long cyclic prefix is for example feasible for IEEE 802.11ax.

Figure 22:
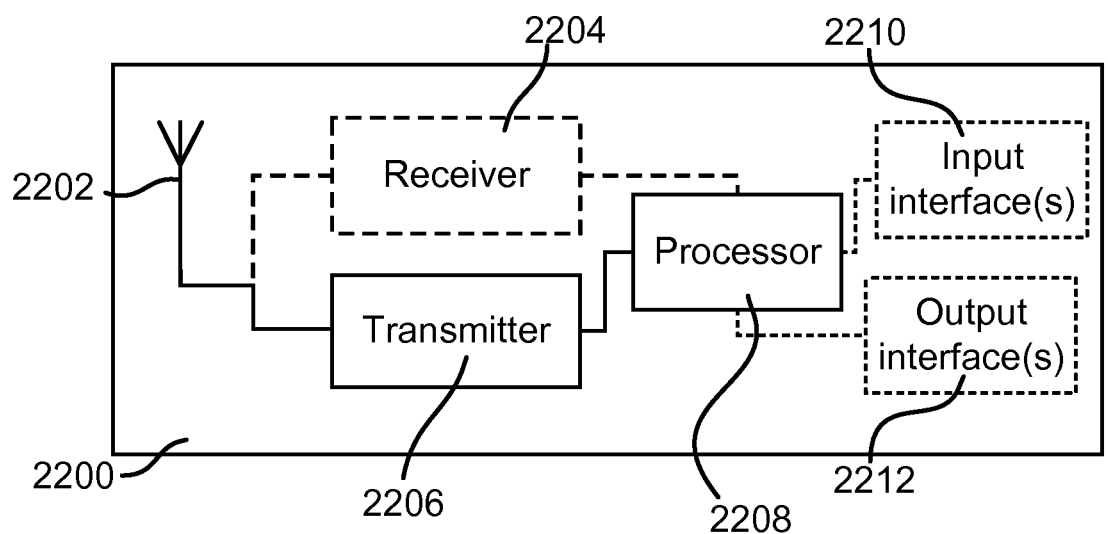
FIG. 22 is a block diagram schematically illustrating elements of a network node.

FIG. 22 is a block diagram schematically illustrating elements of a transmitting entity 2200 of the amplitude shift keying signal as mentioned with reference to the method demonstrated above, and included in any one of the network node 2000 and the access point 2105 demonstrated with reference to FIGS. 20 and 21, respectively.

The transmitting entity 2200 comprises an antenna arrangement 2202, a transmitter 2206 and a processor 2208. The processor 2208 is arranged to determine timing of the OFDM transmission of the concurrently operating transmission system, represent the data signal to be transmitted by amplitude shift keying. The transmitter 2206 is provided with the representation and timing, and is arranged to transmit, through the antenna arrangement 2202, the amplitude shift keyed data signal intermittently aligned with the OFDM transmission such that symbols of the amplitude shift keyed data signal occurs only during the extended part of the OFDM transmission, as demonstrated above.

As also discussed above, the determination of timing may be performed according to different variants. For the case where a control signal is to be exchanged between the systems, the transmitting entity 2200 may be provided with interfaces 2210, 2212 according to the properties of the control signal exchange, e.g. electrical or optical. For example, if the transmitting entity is only receiving a control signal, an input interface 2210 is required, but if a mutual exchange of control signals is desired, both the input interface 2210 and an output interface 2212 may be required. For the case where the transmitting entity is arranged to receive training signals from the concurrently operating transmission system, the transmitting entity comprises a receiver 2204 which may be connected to the antenna arrangement 2202. The receiver 2204 may thus be considered as a wireless interface. The receiver 2204 is then arranged to receive the training signals STF, LTF and possibly the control signalling SIG and provide the acquired information to the processor 2208 such that the processor is enabled to make the determinations from the acquired information. The processing element 2208 may also fulfil a multitude of tasks, ranging from signal processing to enable reception and transmission since it is connected to the receiver 2204 and transmitter 2206, receiving and providing control signals through the interfaces 2210, 12, executing applications, controlling the interfaces 2210, 2212, etc. The interfaces 2210, 2212 can further comprise operator interfaces and/or signal interfaces, e.g. electrical or optical.

The invention claimed is:

1. A method of transmitting an amplitude shift keying signal, the method comprising
   determining timing of an Orthogonal Frequency Division Multiplex (OFDM) transmission of a concurrently operating transmission system, wherein the OFDM transmission applies an extended representation for at least a part of the transmitted OFDM transmission, which extended representation comprises an extended part;
   representing a data signal to be transmitted by amplitude shift keying; and
   transmitting the amplitude shift keyed data signal intermittently aligned with the OFDM transmission such that symbols of the amplitude shift keyed data signal occurs only during the extended part of the OFDM transmission.

2. The method of claim 1, wherein the extended part comprises any of a cyclic prefix and a zero-padding.

3. The method of claim 1, wherein symbols of the amplitude shift keyed data signal are transmitted only during payload symbols of the OFDM transmission.

4. The method of any one of claim 1, wherein one amplitude shift keyed data signal symbol per extended representation is used for the symbols where the amplitude shift keyed data signal occurs.

5. The method of claim 1, wherein one amplitude shift keyed data signal symbol per a plurality of extended representations is used for the symbols where the amplitude shift keyed data signal occurs.

6. The method of any one of claim 1, wherein the alignment with the OFDM transmission is such that symbols of the amplitude shift keyed data signal are provided with a guard interval to the beginning or end of the extended representation of the OFDM transmission, wherein no amplitude shift keyed data signal transmission is performed during the guard interval.

7. The method of claim 1, wherein the representing of the data signal to be transmitted by amplitude shift keying is performed by on-off keying.

8. The method of claim 1, wherein the representing of the data signal to be transmitted by amplitude shift keying is performed by applying a Manchester code.

9. The method of claim 1, wherein the data signal is representing a wake-up signal arranged to address a wake-up radio.

10. A computer program product comprising a non-transitory computer readable medium storing a computer program comprising instructions which, when executed on a processor of a network node, causes the network node to perform the method of claim 1.

11. A transmitter arranged to provide a signal by performing a method comprising:
    determining timing of an Orthogonal Frequency Division Multiplex (OFDM) transmission of a concurrently operating transmission system, wherein the OFDM transmission applies an extended representation for at least a part of the transmitted OFDM transmission, which extended representation comprises an extended part;
    representing a data signal to be transmitted by amplitude shift keying; and
    transmitting the amplitude shift keyed data signal intermittently aligned with the OFDM transmission such that symbols of the amplitude shift keyed data signal occurs only during the extended part of the OFDM transmission.

12. The transmitter of claim 11, wherein the signal is a wake-up signal arranged to address a wake-up radio.

13. A network node comprising the transmitter of claim 11.

14. The network node of claim 13 being arranged to operate as a combined access point for both the OFDM transmissions and the amplitude shift keying data signal transmissions, wherein the determining of timing of the OFDM transmission of the concurrently operating transmission system is provided within the network node.

15. The network node of claim 13 being arranged to operate as an access point for the amplitude shift keying data signal transmissions, wherein the network node comprises an interface for the determining of timing of the OFDM transmission of the concurrently operating transmission system.

16. The network node of claim 15, wherein the interface is arranged to receive transmissions comprising training fields transmitted by the concurrently operating transmission system for the determining of the timing of the OFDM transmission of the concurrently operating transmission system based on the received training fields.

* * * * *